United States Patent
Shen

(10) Patent No.: US 9,441,683 B2
(45) Date of Patent: Sep. 13, 2016

(54) HYDRAULIC AUXILIARY BRAKE DEVICE OF MOTOR USED FOR OIL PRODUCTION

(71) Applicant: Yen-Hong Wong, New Taipei (TW)

(72) Inventor: Kuei-Hsien Shen, New Taipei (TW)

(73) Assignee: Yen-Hong Wong, New Taipei (TW)

( * ) Notice: Subject to any disclaimer, the term of this patent is extended or adjusted under 35 U.S.C. 154(b) by 338 days.

(21) Appl. No.: 14/306,387

(22) Filed: Jun. 17, 2014

(65) Prior Publication Data

US 2015/0362035 A1 Dec. 17, 2015

(51) Int. Cl.

| | |
|---|---|
| *F16D 67/04* | (2006.01) |
| *F16D 55/22* | (2006.01) |
| *E21B 43/12* | (2006.01) |
| *F16D 57/00* | (2006.01) |
| *F16D 127/00* | (2012.01) |

(52) U.S. Cl.
CPC ............. *F16D 55/22* (2013.01); *E21B 43/121* (2013.01); *E21B 43/126* (2013.01); *E21B 43/128* (2013.01); *F16D 57/002* (2013.01); *F16D 2127/004* (2013.01)

(58) Field of Classification Search
CPC ............. F16D 55/22; F16D 2127/004; F16D 27/002; F01C 1/101; E21B 43/121; E21B 43/126; E21B 43/128
See application file for complete search history.

(56) References Cited

U.S. PATENT DOCUMENTS

| | | | | |
|---|---|---|---|---|
| 6,039,115 A * | 3/2000 | Mills | ...................... | E21B 43/126 166/68.5 |
| 6,152,231 A * | 11/2000 | Grenke | .................. | E21B 43/126 166/369 |
| 6,889,765 B1 * | 5/2005 | Traylor | ................. | E21B 43/128 166/105.5 |
| 7,880,418 B2 * | 2/2011 | Petit | .......................... | H02P 3/12 166/53 |
| 8,955,582 B2 * | 2/2015 | Wang | .................... | E21B 43/126 166/105 |
| 9,027,717 B2 * | 5/2015 | Hult | ...................... | E21B 43/126 188/184 |
| 9,163,679 B1 * | 10/2015 | Shen | ...................... | E21B 43/126 |
| 2008/0296011 A1 * | 12/2008 | Hult | ...................... | E21B 43/126 166/75.11 |
| 2013/0255933 A1 * | 10/2013 | Shen | ................... | E21B 47/0007 166/68.5 |

* cited by examiner

*Primary Examiner* — Thomas Irvin
(74) *Attorney, Agent, or Firm* — Rosenberg, Klein & Lee

(57) ABSTRACT

A hydraulic auxiliary brake device of a motor used for oil production is provided. A turning shaft and an oil extraction pump of the motor are provided with a brake disc. The motor is provided with a hydraulic brake. The hydraulic brake is connected with an oil pressure pipe, a one-way clutch gear, and an oil pump. The one-way clutch gear meshes with the brake disc. When the turning shaft and the oil extraction pump of the motor are turned normally for oil production, the one-way clutch idles so that the oil pump doesn't output oil pressure, and the hydraulic brake doesn't activate to brake the brake disc. In case of a power failure, the oil pump is opened to output oil pressure and the hydraulic brake is activated to brake the brake disc, such that the turning shaft and the oil extraction pump are stopped from turning.

1 Claim, 2 Drawing Sheets

HYDRAULIC AUXILIARY BRAKE DEVICE OF MOTOR USED FOR OIL PRODUCTION

BACKGROUND OF THE INVENTION

1. Field of the Invention

The present invention relates to a hydraulic auxiliary brake device of a motor used for oil production, and more particularly to a hydraulic auxiliary brake device having a hydraulic brake to prevent a reverse turning from causing damages in case of a power failure.

2. Description of the Prior Art

A conventional spiral rod motor used for oil production has a long hollow turning shaft and an oil extraction pump to extending into an oil field underground. The turning shaft and the spiral oil extraction pump are turned to extract the petroleum underground. The conventional spiral rod motor doesn't have a brake device. Hence, in case of a power failure, the turning shaft and the oil extraction pump which are very long (about thousands of meters) will a counter-force when they are stopped turning, which causes a reverse turning of the turning shaft and the oil extraction pump. The reverse tuning will cause the petroleum to flow reversely and the pars of the equipment to turn reversely and to cause damages accordingly. To prevent the reverse turning in case of a power failure, it is necessary to provide an apparatus to prevent the petroleum from flowing backward, namely, the conventional motor used for oil production doesn't have a brake device itself. Thus, the conventional motor is unable to brake the turning shaft and the oil extraction pump instantaneously in case of a power failure to result in a reverse turning. Accordingly, the inventor of the present invention has devoted himself based on his many years of practical experiences to solve these problems.

SUMMARY OF THE INVENTION

The primary object of the present invention is to improve the problem of the prior art and to provide a motor having a hydraulic auxiliary brake device. The hydraulic auxiliary brake device comprises a turning shaft, a brake disc, a hydraulic brake corresponding to the brake disc, a one-way clutch gear, an oil pump, an oil pressure pipe connected with the hydraulic brake. When the turning shaft and the oil extraction pump of the motor are turned normally for oil production, the oil pump doesn't output oil pressure and the hydraulic brake doesn't activate. In case of a power failure to cause that the turning shaft is instantaneously turned reversely, the oil pump is opened to output oil pressure and the hydraulic brake is activated to brake the brake disc so as to prevent the turning shaft from turning reversely.

DETAILED DESCRIPTION OF THE PREFERRED EMBODIMENTS

Embodiments of the present invention will now be described, by way of example only, with reference to the accompanying drawings.

Figure 1:
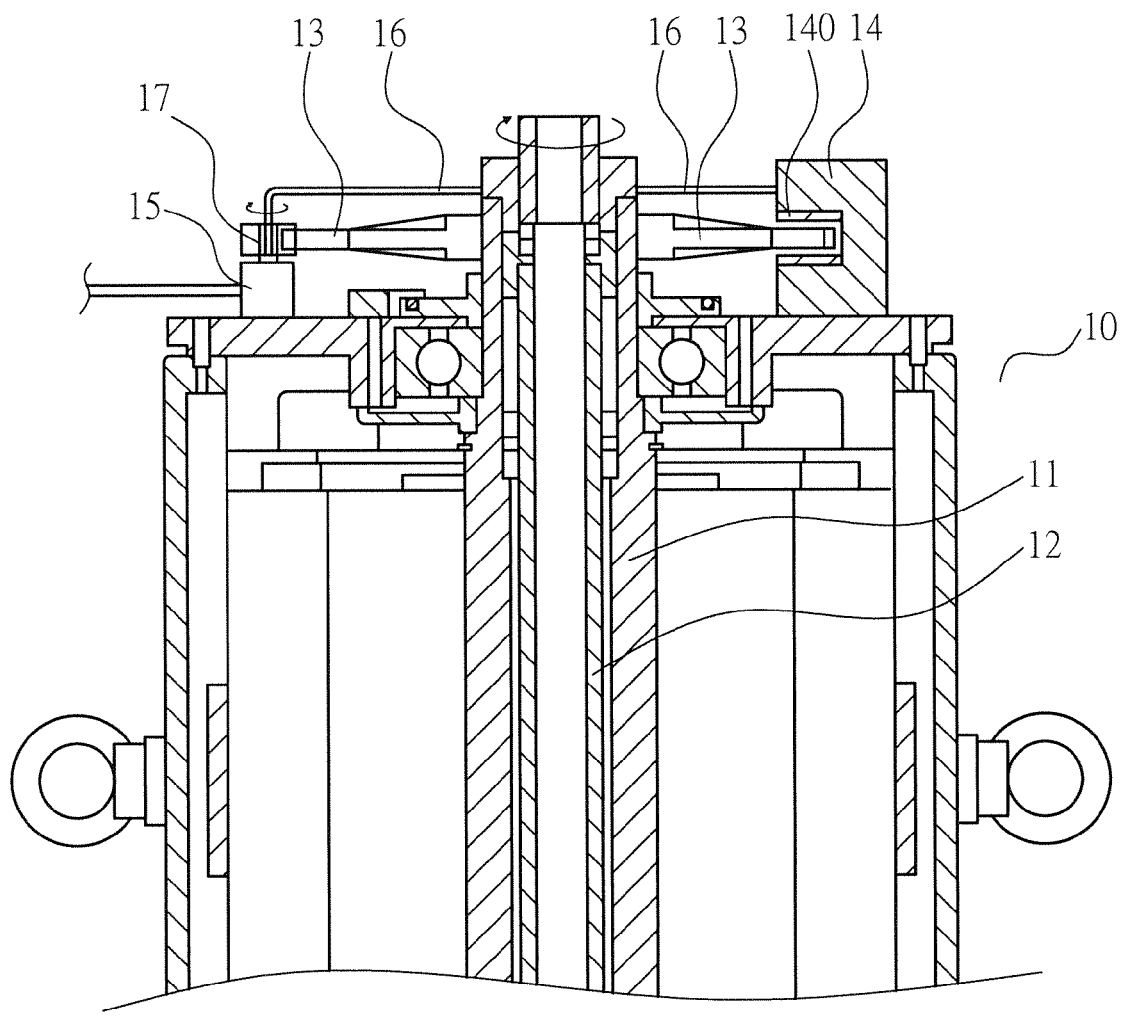
FIG. 1 is a sectional view the present invention, not in a brake state.
Figure 2:
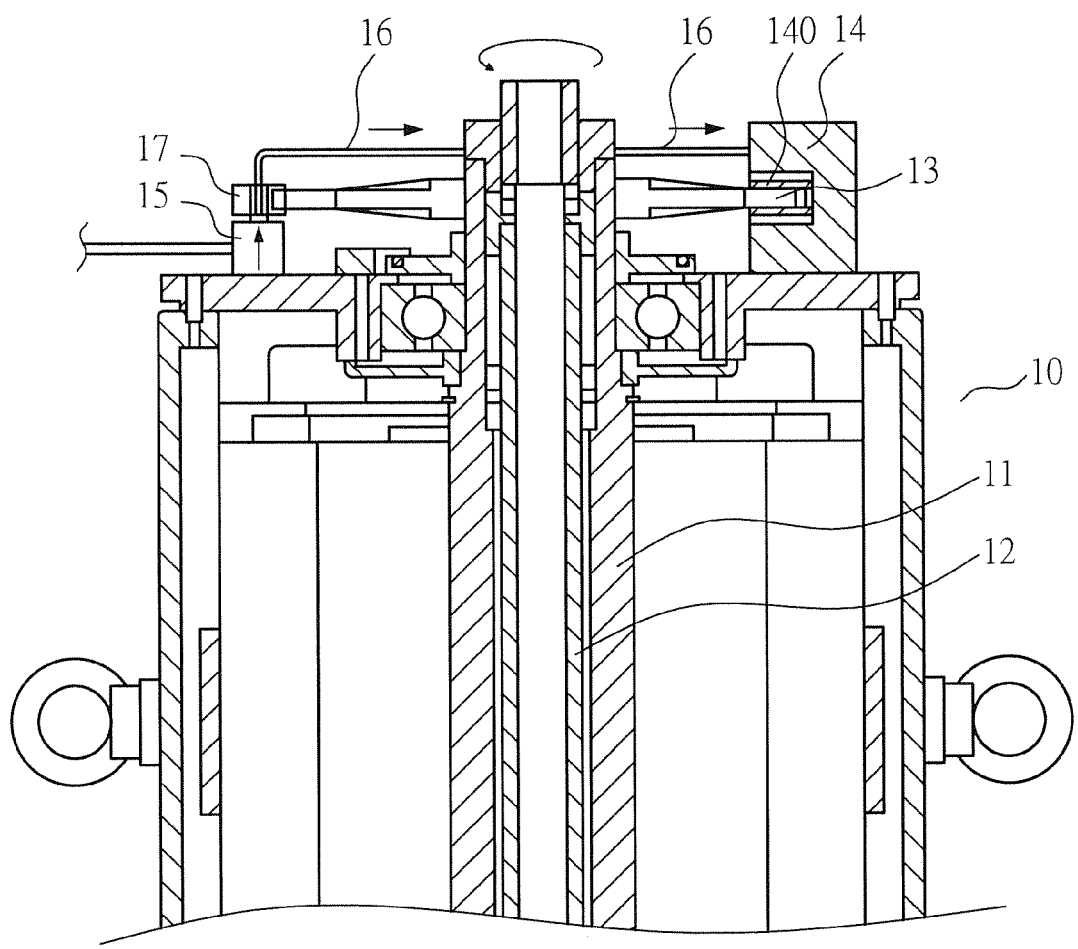
FIG. 2 is a schematic view the present invention in a brake state.

Referring to FIG. 1, a motor 10 has a turning shaft 11 and an oil extraction pump 12 which are integrally linked. The turning shaft 11 is coupled with a brake disc 13. One side of the brake disc 13 is provided with a hydraulic brake 14. The hydraulic brake 14 has a brake caliper 140 corresponding to the brake disc 13. Another side of the brake disc 13 is provided with an oil pump 15. The oil pump 15 is adapted to output oil pressure. The switch valve of the oil pump 15 is connected with a one-way clutch gear 17. The one-way clutch gear 17 meshes with the brake disc 13. The oil pump 15 is provided with an oil pressure pipe 16 connected to the hydraulic brake 14.

According to the aforesaid device and structure, the function and effect of the present invention are described hereinafter. When the motor 10 is turned under the normal power supply, as shown in FIG. 1, although the brake disc 13 makes the one-way clutch gear 17 turn, the one-way clutch gear 17 is in a "disengagement" state to idle. Thus, the switch valve of the oil pump 15 is in a closed state, not outputting oil pressure. The brake caliper 140 of the hydraulic brake 14 doesn't clamp the brake disc 13, so the brake disc 13 is turned normally. In case of a power failure to cause that the turning shaft 11 and the oil extraction pump 12 are turned reversely, the moment that the brake disc 13 is turned reversely makes the one-way clutch gear 17 be in a "engagement" state to turn reversely and link the switch valve of the oil pump 15, so that the oil pump 15 is opened to output oil pressure. Through the oil pressure pipe 16, the brake caliper 140 of the hydraulic brake 14 is activated to clamp the brake disc 13 to achieve a brake effect, such that the turning shaft 11 and the oil extraction pump 12 are instantaneously stopped from turning reversely.

As the foregoing, the auxiliary brake structure of the present invention is integrated with the motor to reduce the size, and can brake quickly to prevent a reverse turning.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A hydraulic auxiliary brake device of a motor used for oil production, the motor having a turning shaft and an oil extraction pump which are integrally linked, the turning shaft being coupled with a brake disc, one side of the brake disc being provided with a hydraulic brake, the hydraulic brake having a brake caliper corresponding to the brake disc, another side of the brake disc being provided with an oil pump, the oil pump being adapted to output oil pressure, a switch valve of the oil pump being connected with a one-way clutch gear, the one-way clutch gear meshing with the brake disc, the oil pump being provided with an oil pressure pipe connected to the hydraulic brake; wherein when the motor being turned under a normal power supply, the brake caliper of the hydraulic brake doesn't clamp the brake disc; in case of a power failure to cause that the turning shaft and the oil extraction pump are turned reversely, the brake disc is turned reversely to bring the one-way clutch gear to turn reversely, the oil pump is opened to output oil pressure to the hydraulic brake, so that the brake caliper of the hydraulic brake clamps the brake disc to prevent a reverse turning.

* * * * *